Oct. 11, 1932.  J. O'CONNELL ET AL  1,882,296
DRIVING AND ACTUATING MECHANISM OF BUTTER CHURNS
Filed Jan. 7, 1931  3 Sheets-Sheet 1

Inventors
Joseph O'Connell
Harold Hamilton Kerr
by Wright, Brown, Quinby & May
Attys.

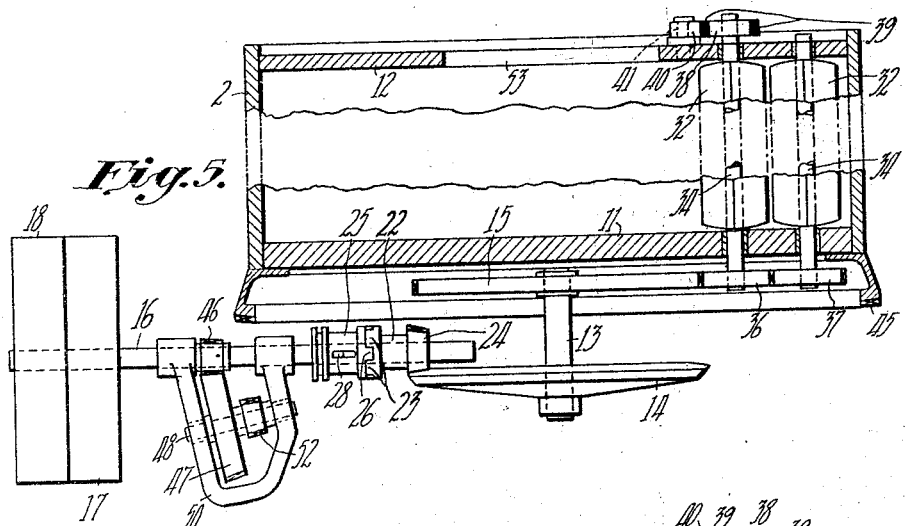
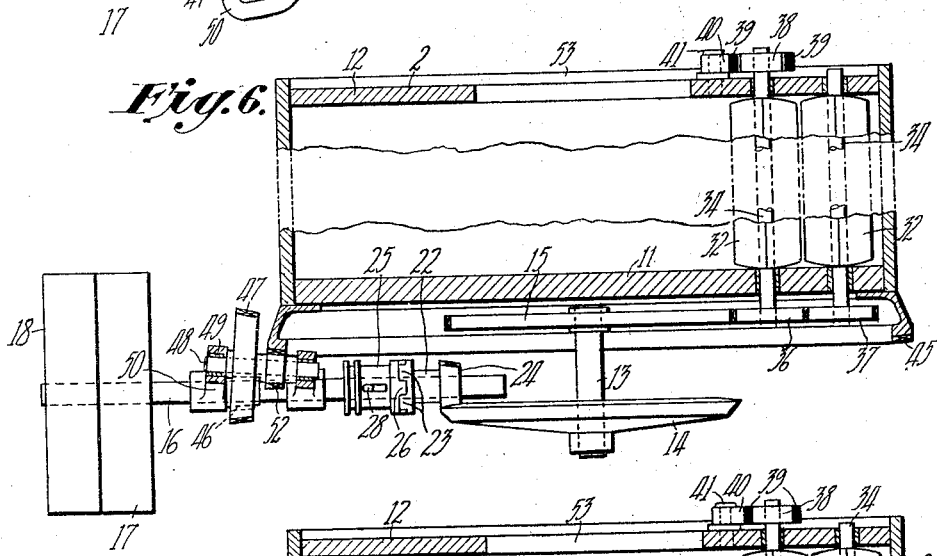
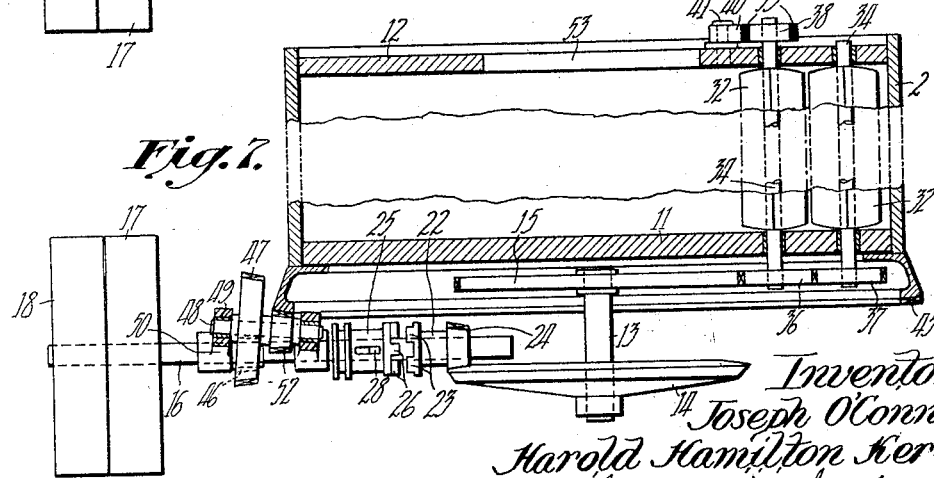

Patented Oct. 11, 1932

1,882,296

UNITED STATES PATENT OFFICE

JOSEPH O'CONNELL AND HAROLD HAMILTON KERR, OF KENSINGTON, VICTORIA, AUSTRALIA

DRIVING AND ACTUATING MECHANISM OF BUTTER CHURNS

Application filed January 7, 1931, Serial No. 507,164, and in Australia January 25, 1930.

This invention relates to improvements in the driving and actuating mechanism of butter churns, more particularly of the rotary type having a revolvable barrel provided internally with rotatable butter workers and supported at the rear, or driving end, by an axially arranged shaft or journal mounted in a fixed bearing, and at the front or open end by an annular flange carried upon bearing rollers.

An object of the invention is to provide improved driving and actuating mechanism for the barrel and the butter workers, whereby the barrel in rotating is adapted to carry with it the butter workers, which at the same time may or may not rotate about their axes. Thus, for example, in the operation of churning, the barrel carries the butter workers with it, but the same do not rotate of themselves, whereas during the butter-working operation, the butter workers rotate about their axes and are moved bodily in a circular course by the rotation of the barrel.

Another object of the invention is the provision of locking means, mounted on the barrel and releasably engageable with the butter workers whereby the worker rollers are held fast and prevented from turning on their axes, and the barrel is rotated at a comparatively high speed adequate for churning.

A further object of the invention resides in the provision of disconnectible speed reduction gearing, whereby, after the locking means have been released to set free the butter workers, the barrel is rotated at a rate less than the speed for churning and the worker rollers are revolved about their axes, the rotary speeds of the barrel and the worker rollers then being suitable for butter working.

Yet another object of the invention is the provision of disengageable clutch members whereby the butter workers may be disconnected from the driving mechanism and secured against rotation by the locking means above referred to, so that they will not be rotated on their axes while the barrel is revolved at a low speed by the reduction gearing during the emptying of the churn.

Other objects and features of the invention will appear hereinafter in the following description of a practical embodiment illustrated in the accompanying explanatory drawings wherein—

Figures 5, 6 and 7 are diagrammatical views illustrating respectively the several associations of elements of the driving mechanism for churning, butter working and emptying.

Figure 1:
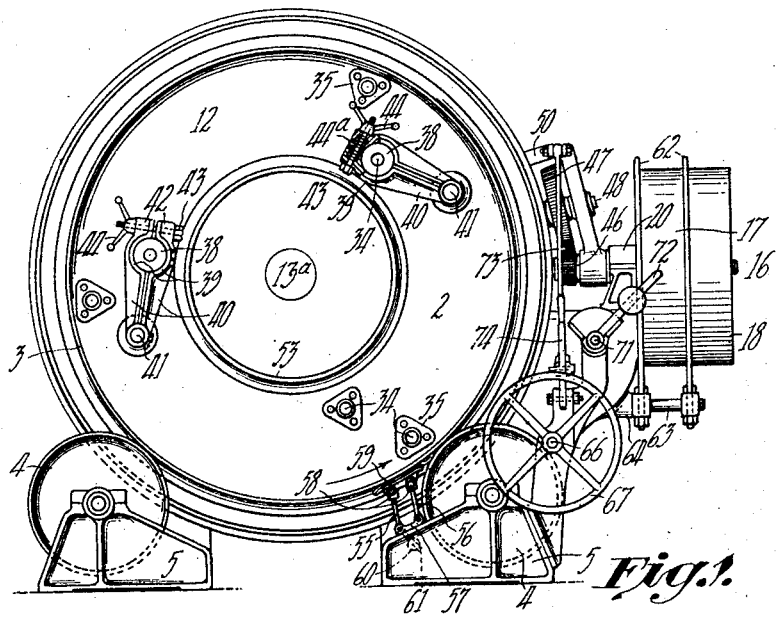
Figure 1 is a view in front elevation of a churn embodying the invention.

In these drawings the numeral 1 designates a main frame, and 2 a churn barrel having an annular concentric flange or rail 3 supported by and adapted to rotate upon bearing rollers 4 rotatably mounted in pedestals 5 rigidly connected to the main frame 1 by tubular members 6.

Figure 2:
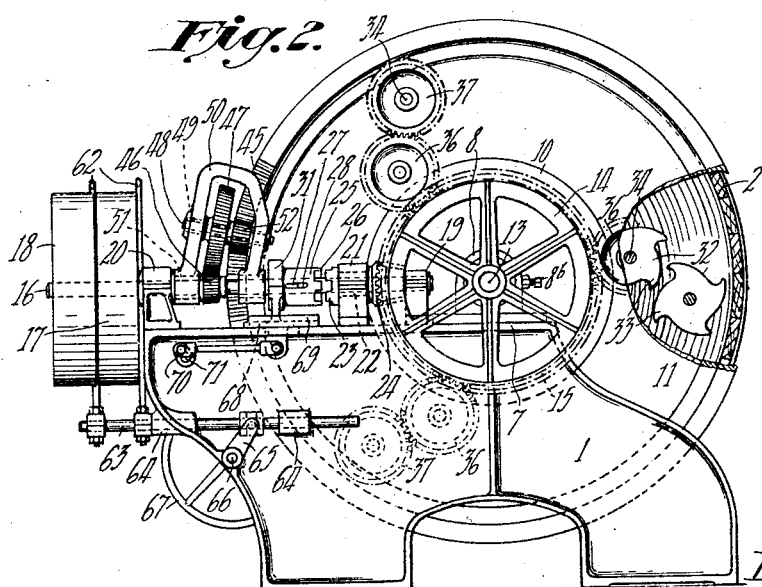
Figure 2 is a view in rear elevation and part section of the churn shown in Figure 1.

The upper side of the main frame 1 is provided with a platform 7 (Figure 2) having fixed thereon a main bearing 8 which supports a hollow shaft or journal 9 forming an extension of a wheel or spider 10 bolted or otherwise fixed to the closed or rear end 11 of the barrel 2. The hollow shaft or journal 9 rotatably supports the rear end of the barrel 2, the open or front end 12 of said barrel being supported by the annular flange or rail 3 and bearing rollers 4. In order that the barrel 2 may be freely supported by the rollers 4 and the main bearing 8, and to compensate for wear and inaccuracy of alignment of said rollers and bearing, the journal 9 is rotatably mounted in a self-aligning sleeve 8$^a$ (Figure 4) the outer surface of which is spherically formed to fit a spherical seating in the main bearing 8. The spherically formed sleeve 8$^a$ renders the barrel 2 self-adjusting and ensures that said barrel is freely supported by the rollers 4 and main bearing 8 at all times without binding or straining. Rotation of the sleeve 8$^a$ in the main bearing 8 may be prevented by a set screw 8$^b$ or by other suitable means. The set screw 8$^b$ extends into a hole or recess in the sleeve 8$^a$ said hole or recess having a greater diameter than the set screw 8b in order that the same may not restrict the self-aligning movement of the sleeve 8a in the main bearing 8.

Extending axially through the hollow journal 9 is a shaft 13 having fixed to its outer end a bevel or crown wheel 14 and to its inner end a spur wheel 15, and positioned at right angles to the journal 9 and shaft 11 is a driving shaft 16 having fast and loose belt pulleys 17 and 18 mounted upon its end remote from the journal 9.

The driving shaft 16 is supported in bearings 19 and 20 fixed to the platform 7, and rotatably mounted upon the driving shaft 16 and revolvable in a bearing 21, likewise fixed to said platform, is a sleeve 22 (Figure 2) which at one end is provided with clutch teeth or dogs 23 and at the opposite end with a bevel pinion 24 meshed with the crown wheel 14.

Slidably mounted on the driving shaft 16 is a clutch sleeve 25 having clutch teeth or dogs 26 engageable with the clutch teeth 23, and also opposed slots 27 into which extend the opposite ends of a pin or cotter 28 fixed transversely in the driving shaft 16. The pin or cotter 28 forms a driving connection between the shaft 16 and the clutch sleeve 25, whereby said sleeve is enabled to rotate the sleeve 22 at the same speed as the driving shaft 16, when the clutch teeth or dogs 26 are engaged with the clutch teeth or dogs 23.

It will be understood that the clutch sleeve 25 may be keyed to or otherwise slidably and non-turnably mounted on the driving shaft 16.

The end of the clutch sleeve 25 remote from the clutch teeth or dogs 26 is provided with a peripheral groove 29, into which extends an internal peripheral flange 30 on a clutch sliding member or shifter 31 (Figure 2) slidably mounted on the platform 7 and provided with actuating means hereinafter referred to, whereby it may be moved in endwise directions and held to maintain the clutch teeth 26 in engagement with or disconnected from the clutch teeth 23.

The butter worker rollers 32, provided with interacting curved blades 33, are arranged in co-acting pairs at equal distances apart in the barrel 2, and are supported on spindles 34 rotatably mounted in bearings 35 fixed in the rear and front ends 11 and 12. The spindles 34 extend outwardly from the bearings 35, and their rear ends have fixed upon them equal intermeshing gears 36 and 37 (Figure 2), the gears 36 nearer to the axis of the barrel 2 being meshed with the spur wheel 15. By means of the equal intermeshing gears 36 and 37, the worker rollers 32 may be rotated at the same speed but in opposite directions, so that the blades 33 of each pair of said rollers will remain in step, the blades 33 of the one passing without contact into and out of the inter-spaces between said blades of the other.

The blades 33 are parallel to the axes and extend from end to end of the worker rollers 32, and said blades in cross section are somewhat undercut on one side and have a curved outline or profile and are concave on the undercut side and convex on the opposite side, the radius of curvature of the convex side being greater than the radius of curvature of the concave side. When so made the worker rollers 32 have acute angle blades and in rotating cut the butter, and are more efficient than worker rollers having blades of usual radial form.

Figure 4:
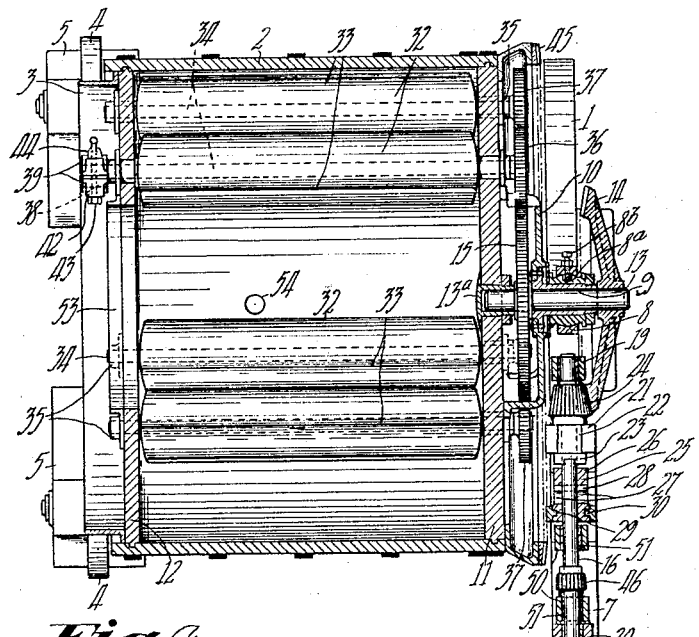

The spindles 34 of one of each pair of worker rollers 32 may be extended from the front end 12 of the barrel 2 (Figure 4). The spindles 34 selected for extension may be those of worker rollers 32 positioned either nearer to or further from the axis of the barrel 2, and preferably the spindle 34 of one worker roller 32 of two pairs only of said rollers is so extended.

Upon the ends of the two extended spindles 34 are firmly secured brake drums 38 (Figure 1), and disposed about or embracing said drums are approximately semi-circular brake shoes 39 formed on arms 40 pivoted on pins or studs 41 securely fixed to the front end 12 of the barrel 2.

The ends of the arms 40 remote from the pins or studs 41 are provided with lugs 42 through which are passed clamping bolts or threaded spindles 43 having clamping nuts or handles 44, by means of which the said arms may be drawn together to apply the brake shoes 39 to the brake drums 38 to frictionally hold and maintain said drums stationary, thereby preventing rotation of the spindles 34, worker rollers 32 and the intermeshing gears 36 and 37.

The lugs 42 of each pair of arms 40 are chambered to accommodate springs 44a (Figure 1) through which the bolts 43 extend, and which oppose the application of the brake shoes 39 to the brake drums 38 by the clamping nut 44 and ensure prompt releasement of said shoes when the clamping nuts 44 are slackened.

It will be understood that positive locking means may be employed, in lieu of the brake shoes 39 and brake drums 38, for preventing rotation of the worker rollers 32. However, said shoes and drums provide a yieldable resistance to the rotary motion of the worker rollers, which will slip more or less and prevent possible breakage of gears and other parts in the event of heavy masses of butter falling from one pair of worker rollers upon another during the rotation of the barrel 2.

Bolted or otherwise firmly secured to the rear end 11 of the barrel 2 is an annular bevel rack 45 (Figure 2), and fixed to the driving shaft 16 is a bevel pinion 46 which is at all times meshed with a bevel gear 47 fixed to a counter shaft 48 rotatably mounted in bearings 49 carried in a swinging frame 50 (Figure 5). The swinging frame 50 is pivotally supported upon the driving shaft 16 and is provided with bushings 51 (Figure 4) in which said shaft rotates. Said swinging frame may be turned about the driving shaft 16 to engage and mesh a bevel pinion 52 (Figure 2) fixed to the shaft 48 with the annular rack 45 in order that the barrel 2 may be slowly rotated by the driving shaft 16 through a reduction gear train comprising the pinion 46, bevel gear 47, shaft 48, bevel pinion 52 and annular rack 45.

The counter shaft 48 is mounted in a sloping position in the swinging frame 50, as shown by Figures 6 and 7, the inclination of said shaft being such that its axis, if prolonged, will pass through the point of intersection of the axes of the shafts 13 and 16. The common point of intersection of the axes of said shafts 13, 16 and 48 also forms the meeting point of the pitch lines of the bevel gears 14, 24, 45, 46, 47 and 52. The common point of intersection of the axes of said shafts and pitch lines also forms the centre of the spherical seating in the main bearing and of the spherically formed sleeve 8ª. When the driving mechanism is constructed and arranged in this way, the meshing of the gears will not be affected by any self-adjusting movements of the barrel 2, and said gears will be correctly engaged at all times and will be noiseless in operation.

In the practical operation of the churn for butter making, cream is poured into the barrel 2 through the usual opening 53 (Figure 5) in the front end 12. Firstly assuming the clutch dogs 23 and 26 to be disengaged, the brake shoes 39 to be clear of the brake drums 38, and the swinging frame 50 to be located so that the pinion 52 is not meshed with the annular rack 45. If the driving belt be shifted from the loose pulley 18 to the fast pulley 17, the driving shaft 16 and bevel pinion 46 will rotate and the bevel gear 47, counter shaft 48 and pinion 52 will run idly, no movement being imparted to the barrel 2 and the worker rollers 32 or other parts.

If now the clutch dogs 23 and 26 be engaged, the bevel pinion 24 will rotate the crown wheel 14, shaft 13 and spur wheel 15 which in turn will revolve the intermeshing gears 36 and 37, spindles 34 and worker rollers 32, but the barrel 2 will remain stationary.

If, however, rotation of the worker rollers 32, spindles 34, and intermeshing gears 36 and 37 be prevented by tightening the brake shoes 39 on the brake drums 38 as previously described, said gears will become locked and will be carried bodily around by the spur wheel 15 taking with them the barrel 2 by means of the spindles 34. The worker rollers 32 will not rotate and will be carried around with the barrel 2 as required for churning.

The barrel 2 will be rotated at a comparatively high speed suitable for churning, and it has been found that for churns of the size for making butter under usual manufacturing conditions, a speed of the barrel of approximately 19 revolutions per minute is required. Accordingly the revolutions of the fast pulley 17 and the driving shaft 16 and the ratio of the pinion 24 and crown wheel 14 are preferably designed to give this speed to the barrel 2.

For the purposes of butter working it is desirable that the worker rollers 32 should rotate while the barrel 2 is slowly revolving. Accordingly, the brake shoes 39 are released from the brake drums 38, so that the worker rollers 32 are set free to be rotated as above described, and the swinging frame 50 is turned about the shaft 16 to engage the pinion 52 with the annular rack 45. The barrel 2 is then slowly rotated by the driving shaft 16 through the reduction gear train consisting of the pinion 46, bevel gear 47, counter shaft 48, bevel pinion 52 and annular rack 45. It has been found that for churns of average size for manufacturing purposes, a speed of the barrel 2 of 4 revolutions per minute is sufficient. Accordingly, whereas the driving shaft 16 is rotated at a speed suitable for churning, said reduction gear train is designed to give the barrel 2 a speed of approximately 4 revolutions per minute.

To enable the butter to be emptied from the churn and deposited on removing apparatus (not shown) inserted through the opening 53, it is necessary that the worker rollers 32 should cease rotating while the barrel 2 continues to revolve slowly.

Accordingly, the clutch teeth or dogs 23 and 26 are disengaged so that power is not transmitted to the worker rollers 32, whereas the barrel 2 continues to be slowly rotated by said reduction gear train. The worker rollers 32 are again held stationary by clamping the brake shoes 39 upon the brake drums 38, and the spur wheel 15, shaft 13, and the crown wheel 14 and pinion 24 rotate idly. The worker rollers 32 then function as elevators and lift the butter to such a height that it will fall from said rollers upon the removing apparatus.

Figure 3:
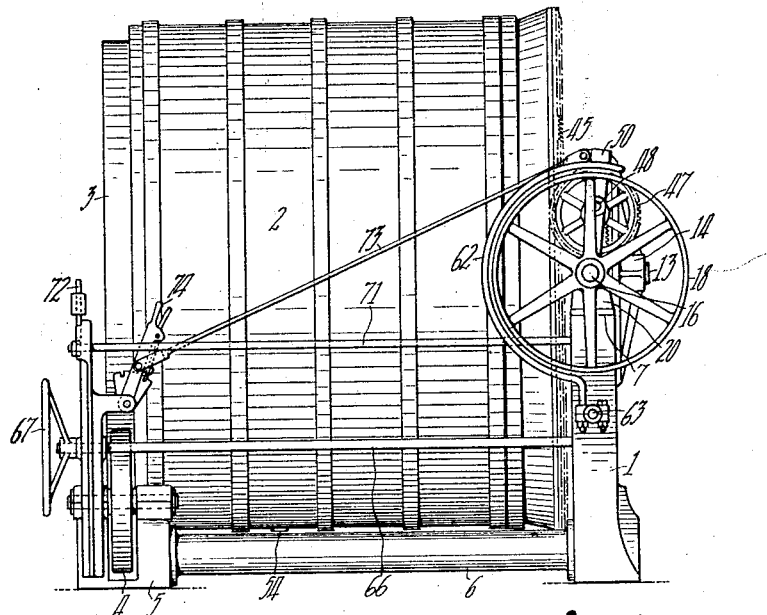
Figures 3 and 4 are views respectively in side elevation and sectional plan of the churn shown in Figures 1 and 2.

Before removing the butter as above described, it is necessary to drain away the butter milk and water through a removable plug 54 (Figures 3 and 4) provided in the barrel 2 which is brought to rest with the plug 54 in its lowest position. The butter oftentimes becomes collected more or less on one of the pairs of worker rollers 32, and when the barrel 2 is brought to rest it is apt to be rotated by the weight of the collected butter so that the drain plug 54 is more or less raised from its lowest position.

To prevent rotation of the barrel 2 in this way by the butter, parallel toggle arms 55 and 56 (Figure 1) are pivoted on a bracket 57 mounted on one of the pedestals 5. The ends of the toggle arms 55 and 56 are hingedly connected by pins 58 to a brake shoe 59 which contacts with the periphery of the annular flange 3 or with a peripheral band or the like on the barrel 2, and is so positioned that said flange or band in rotating will move upwardly past the brake shoe 59.

The weight of the toggle arms 55 and 56 and of the brake shoe 59 maintains said shoe in frictional contact with the annular flange 3, and the brake shoe 59 may be caused to bear more or less lightly on said flange by a counterweight 60 adjustably mounted on an arm 61.

The arms 55 and 56 are inclined to the periphery of the flange 3 and when said flange is rotating upwardly the friction set up opposes the weight of said arms and brake shoe so that the latter bears lightly upon the flange 3. If, however, the motion of the flange 3 is reversed the friction and the weight of the arms 55 and 56 and of the brake shoe 59 act in the same direction, so that said brake shoe 59 is drawn downwardly, and the arms 55 and 56 tend to become at right angles to the periphery of the flange 3. A powerful wedging or jamming action is accordingly set up which applies the brake shoe 59 forcibly against the flange 3 and prevents descent of the barrel 2 under the weight of the butter collected on the worker rollers 32, so that the drain plug 54 will remain in its lowest position.

The belt shifter (Figures 1 and 2) comprises curved fingers or prongs 62 fixed to a rod 63 sliding in bearings 64 on the main frame 1, and said rod is movable in endwise directions by an arm 65 (Figure 2) mounted on a shaft 66 extending to the front of the churn, and provided with a control wheel or lever 67.

The clutch sliding member or shifter 31 (Figure 2) previously mentioned, is provided with a bar 68 slidable in guides 69 on the platform 7 and connected with an arm 70 mounted on a shaft 71 extending to the front of the churn and provided with a weighted control lever or tumbler 72 (Figure 1).

The swinging frame 50 is connected by a rod 73 (Figure 3) with an operating lever 74 likewise positioned at the front of the churn.

As the clamping bolts or threaded spindles 43 of the brake shoes 39 are also positioned at the front end of the barrel 2, it will be observed that all the manually actuated means whereby the actions of the churn are controlled are located at the front of the same in positions very convenient for an operator.

For convenience of illustration the various gears, shafts and other parts are shown without coverings but it will be understood that the same may be enclosed in suitable housings or casings.

We claim:

1. In a butter churn having a rotary barrel with revolvable butter workers therein, a driving member, gearing for rotating the butter workers, a clutch for connecting the gearing with the driving member, releasable locking means engageable with the butter workers to prevent their rotation by the gearing, and an adjustable gear train operatively connecting the barrel with the driving member, whereby when the clutch connects the gearing with the driving member and the releasable locking means engages the butter workers said driving member rotates the barrel and stationary butter workers at a speed required for churning and when the gear train operatively connects the barrel with the driving member and the releasable locking means is disengaged from the butter workers the driving member through the gear train revolves the barrel and rotating butter workers at a lower speed for butter working, and when the clutch releases the gearing from the driving member and said locking means engages the butter workers said driving member through the gear train rotates the barrel and stationary butter workers at a slow speed for emptying.

2. In a butter churn having a rotary barrel with revolvable butter workers therein, a driving shaft, gearing for rotating the butter workers, a clutch for connecting the gearing with the driving shaft, brake drums on the butter workers, brake shoes mounted on the barrel and engageable with the brake drums to prevent rotation of the butter workers by the gearing, a gear on the barrel, a pinion on the driving shaft and an adjustable reduction gearing to operatively connect the pinion with the gear on the barrel.

3. In a butter churn having a rotary barrel with pairs of revolvable worker rollers therein, a driving shaft, spindles supporting the pairs of rollers in the barrel, equal intermeshing gears fixed upon the spindles of each roller of each pair of worker rollers, a gear wheel disposed concentrically about the axis of the barrel and engaging one of the equal intermeshing gears to rotate the worker rollers, means for rotating the gear wheel, a clutch connecting said means with the driving shaft, releasable locking means on the barrel engageable with the spindles to prevent rotation of the worker rollers by said gear wheel, an annular rack on the barrel, a pinion on the driving shaft, an adjustable countershaft, a gear on the countershaft meshed with the pinion on the driving shaft, and an adjustable pinion on the countershaft to be engaged with the annular rack.

4. In a butter churn having a rotary barrel with pairs of rotatable worker rollers therein, a supporting frame, a main bearing on the supporting frame, a spherical seating in the main bearing, a spherically formed sleeve fitting the spherical seating, a spider wheel fixed concentrically to the closed end of the barrel, a journal on the spider wheel rotatably fitting the spherically formed sleeve, an axial shaft extending through the journal, a spur wheel fixed to the shaft at the inner end of the journal, spindles supporting the pairs of worker rollers in the barrel, intermeshing gears on each spindle of each pair, one gear of each pair engaging the spur wheel, brake drums on the spindles, pairs of arms pivotally supported on the barrel, brake shoes on the arms, clamping means to apply the brake shoes to the brake drums, a crown wheel fixed to said shaft at the outer end of the journal, a driving shaft mounted in bearings fixed to the supporting frame, a sleeve rotatable on the driving shaft, a bevel pinion on the sleeve engaged with the crown wheel, clutch dogs on the sleeve, a slidable clutch sleeve non-turnably mounted on the driving shaft, clutch dogs on the slidable sleeve engageable with the clutch dogs on the sleeve, an annular bevel rack fixed to the barrel, a bevel pinion fixed to the driving shaft, a swinging frame pivoted on the driving shaft, a countershaft in the swinging frame, a bevel gear on the countershaft meshed with the bevel pinion on the driving shaft, and a bevel pinion adjustable on the counter shaft and engageable with the annular bevel rack by a movement of the swinging frame.

5. Churn-actuating mechanism as claimed in claim 4, wherein the driving shaft is positioned at right angles to the journal with its axis intersecting the axis of the axial shaft in said journal, and the said countershaft is mounted in inclined position in the swinging frame, and wherein the prolongation of the axis of the countershaft passes through the point of intersection of the axes of the driving shaft and said axial shaft, the common point of intersection of the axes of the said shafts forming the meeting point of the pitch lines of the crown wheel, the bevel pinion on the sleeve, the pinion on the driving shaft, the bevel gear and the pinion on the countershaft and the annular bevel rack, and said common point also forming the centre of the spherical seating and the spherically formed sleeve.

6. Churn-actuating mechanism as claimed in claim 4, having pulleys on the driving shaft, a belt shifter slidably mounted on the supporting frame, a clutch shifter engaged with the clutch sleeve, and slidable on the supporting frame, oscillatable means for rotating the swinging frame to engage and disengage the pinion on the countershaft with the annular bevel rack, and control means mounted at or near the front end of the barrel and connected with the belt shifter, the clutch shifter and said oscillatable means.

7. In a butter churn having a rotary barrel with pairs of revolvable worker rollers therein, a driving shaft, spindles supporting the pairs of worker rollers in the barrel, equal intermeshing gears fixed upon each spindle of each pair of worker rollers, a gear wheel disposed concentrically about the axis of the barrel and engaging one of each pair of equal intermeshing gears to rotate the worker rollers, means for rotating the gear wheel, and releasable locking means on the barrel engageable with the spindles to prevent rotation of the equal intermeshing gears, whereby when the releasable locking means is disengaged from the spindles, said intermeshing gears will be rotated by said gear wheel and the worker rollers will revolve at the same speed in opposite directions the barrel meanwhile remaining stationary, and when the said locking means are engaged with the spindles to prevent the same rotating, the intermeshing gears will become locked with the gear wheel and the barrel will rotate with the said gear wheel carrying the stationary worker rollers with it.

In testimony whereof we have affixed our signatures to this specification.

JOSEPH O'CONNELL.
HAROLD HAMILTON KERR.